US009262067B1

(12) United States Patent
Bell et al.

(10) Patent No.: US 9,262,067 B1
(45) Date of Patent: Feb. 16, 2016

(54) APPROACHES FOR DISPLAYING ALTERNATE VIEWS OF INFORMATION

(71) Applicant: Amazon Technologies, Inc., Reno, NV (US)

(72) Inventors: Matthew Paul Bell, Sunol, CA (US); Dong Zhou, San Jose, CA (US); Guenael Thomas Strutt, San Jose, CA (US); Isaac Scott Noble, Soquel, CA (US); Stephen Michael Polansky, Santa Clara, CA (US); Jason Robert Weber, Mountain View, CA (US)

(73) Assignee: Amazon Technologies, Inc., Reno, NV (US)

( * ) Notice: Subject to any disclaimer, the term of this patent is extended or adjusted under 35 U.S.C. 154(b) by 81 days.

(21) Appl. No.: 13/709,643

(22) Filed: Dec. 10, 2012

(51) Int. Cl.
*G06F 3/041* (2006.01)
*G06F 3/0488* (2013.01)

(52) U.S. Cl.
CPC .................................... *G06F 3/0488* (2013.01)

(58) Field of Classification Search
CPC ........................... A01B 12/006; G06F 3/0488

USPC .......................................................... 345/173
See application file for complete search history.

(56) References Cited

U.S. PATENT DOCUMENTS

| 2008/0284795 | A1* | 11/2008 | Ebert et al. ..................... 345/619 |
| 2010/0259500 | A1* | 10/2010 | Kennedy ....................... 345/173 |
| 2011/0161854 | A1* | 6/2011 | Shukla .......................... 715/771 |
| 2014/0129976 | A1* | 5/2014 | Beaurepaire et al. ......... 715/788 |

* cited by examiner

*Primary Examiner* — Charles V Hicks
(74) *Attorney, Agent, or Firm* — Novak Druce Connolly Bove + Quigg LLP

(57) ABSTRACT

Approaches are described which enable a computing device (e.g., mobile phone, tablet computer) to display alternate views or layers of information within a window on the display screen when a user's finger (or other object) is detected to be within a particular range of the display screen of the device. For example, a device displaying a road map view on the display screen may detect a user's finger near the screen and, in response to detecting the finger, render a small window that shows a portion of a satellite view of the map proximate to the location of the user's finger. As the user's finger moves laterally above the screen, the window can follow the location of the user's finger and display the satellite views of the various portions of the map over which the user's finger passes.

25 Claims, 9 Drawing Sheets

APPROACHES FOR DISPLAYING ALTERNATE VIEWS OF INFORMATION

BACKGROUND

People are increasingly relying on computing devices, such as tablets and smart phones, which utilize touch sensitive displays. Conventionally, these displays can be used to display a wide variety of information, including maps, images, graphical user interface elements and the like. A user can touch an interface element being displayed on the screen in order to activate a particular function on a device.

Certain types of information can be displayed using a number of different views, layers or formats. For example, a map of an area can be displayed using of several alternate views, such as a "road map view" showing the logical layout of the streets and intersections, or a "satellite view" showing the topographical terrain of the area. Conventionally, a user is able to select only one of these alternate views at a time to be used for rendering the map information on the screen.

BRIEF DESCRIPTION OF THE DRAWINGS

Various embodiments in accordance with the present disclosure will be described with reference to the drawings, in which.

DETAILED DESCRIPTION

Figure 1:
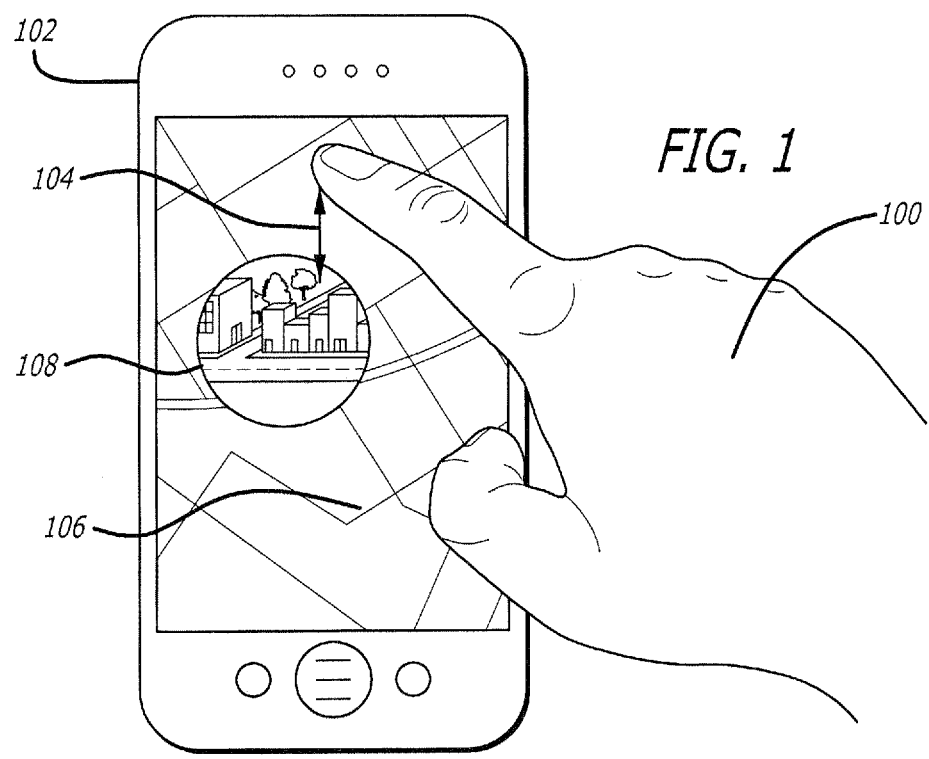
FIG. 1 illustrates an example of displaying alternate views of a map on a screen of a portable computing device, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with various embodiments of the present disclosure may overcome one or more of the aforementioned and other deficiencies experienced in conventional approaches for controlling the display of various information in an electronic environment. In particular, various approaches discussed herein enable a computing device (e.g., mobile phone, tablet computer) to display alternate views or layers of information within a window (or other interface region) on the display screen when a user's finger (or other object) is detected to be within a particular range of the display screen of the device (e.g., hovering above the device or positioned within a specified distance of a sensor of the device). For example, a device displaying a road map view of a map on the display screen may detect a user's finger near the screen and, in response to detecting the finger, render a small window (or other interface element or region) that shows a portion of a satellite view of the map proximate to the location of the user's finger. In this particular example, as the user's finger moves laterally above the screen (e.g., laterally with respect to a primary plane of the screen and at approximately the same distance from the screen), the window can follow the location of the user's finger and display the satellite views of the various portions of the map over which the user's finger passes.

In addition to mapping, numerous other types of applications can utilize the approaches for displaying alternate views of information. For example, in an educational context, a diagram of the human body (or other organism) may be displayed using alternate views, such as a first view for the skin layer, a second view for the muscles layer, and a third view for the bones layer, wherein at least one of the views can be shown within a window on the display screen under the user's finger. An architectural diagram may be displayed using different views, such as an exterior view displayed on the screen with a cutaway interior view displayed within the window under the user's finger. A diagram of multiple earth layers may be displayed using the approaches described herein to control which earth layer is being shown. Images of mechanical devices can be displayed using the approaches described herein to show the portions of the device that are located underneath or behind a component that may be blocking the view of the hidden portions. Computer aided design (CAD) applications and photo editing applications can utilize the approaches described herein to show different views, layers or formats of the diagram or image being displayed. Effectively any information that can be presented using multiple views can utilize the approaches described throughout this disclosure.

In various embodiments, the computing device may be displaying a first view of information on the display screen when the device detects an object, such as a user's finger, within range of the device. When the device detects the object, the device renders a second view of information within a window (or other interface region) proximate to the position of the finger. In various embodiments, the two views may be alternative representations of the same object (e.g., map, diagram, image, etc.) or of different object(s). As such, the two views may have at least a portion of common information between them but are not necessarily different views of identical information. Thus, in one embodiment, the second view includes at least a portion of information included in the first view of information and at least some other information which is not included in the first view of information. For example, if the information is a diagram of a human body, the first view (e.g., skin view) of that information could include some common information with the second view (e.g., muscular view), such as the general shape of the human body, head, arms, and the like. In addition, the first view would include information that is not included within the second view, such as skin color, blemishes, hair, and the like. In various embodiments, the alternate views of information can include graphical information, text, audio, different layers of information, varying degrees of information, and the like.

In various embodiments, the window displaying the alternate view of the information can be any region on the display screen that is oval, rectangular, or of any other shape. The window can contain within it a display of the second view of information and the window can serve to delineate the second view from the first view of information displayed on the remaining portion of the screen. In some embodiments, the window is simply a region of the display screen for displaying the second view of information, while in other embodiments, the window may additionally include its own graphical elements or graphical user interface (GUI) controls that may be accessible by the user. In some embodiments, the window may include a line or border around the window, while in other embodiments, the window may be a borderless window.

In some embodiments, the size of the window can be adjusted depending on the distance between the user's finger and the display screen. For example, when the user's finger gets closer to the screen, the size of the window may be increased and when the finger moves away from the screen, the size can be decreased. In some implementations, when the finger comes in physical contact with the screen, the entire display screen can be filled with the view that was being displayed within the window.

In other embodiments, when three or more views of the information are available, the distance of the user's finger can be used to determine which of the views should be displayed within the window. For example, if an image of a human body is being displayed using a skin view, the user's finger hovering at a first distance from the screen may cause a window to be rendered that shows a portion of the muscle view of the body underneath the user's finger. When the user's finger gets closer to the display screen, such as to within at least a second distance from the screen, the window may change and begin to display a portion of a skeleton view (e.g., bone structure) of the body under the finger. In some embodiments, there can be ranges or distances corresponding to each of the multiple views. For example, when the user's finger is within the range from 3 to 6 inches away from the screen, the device may display the muscle view, and when the finger is within the range from 0 to 3 inches away from the screen, the device may display the skeleton view.

In various embodiments, any object or feature of a user can be used to activate the display of alternate views within the window, including but not limited to a user's finger, multiple fingers, a hand, a stylus, a pen, or the like. One or more sensors can be used to locate the object (e.g., finger) in space above a device. For example, one or more cameras can be utilized, which may use infrared (IR) light for illumination, in combination with one or more capacitive sensors that can fill in the areas where the finger would be out of the field of view of the cameras. The sensors can be used independently or in combination with one another to enable the device to determine the location of the object and the distance of the object from the display screen (e.g., absolute height). The device can then use the position and the distance of the detected object to render the window displaying the alternate view on the screen.

In some embodiments, the display of the alternate view can be controlled using a button (or other input means) as a "clutch," such that when the button is pressed down, the window rendering is activated proximate to the location of the finger above the screen and when the button is released, the window is deactivated (removed) from the display. Alternatively, the press of a button (or the release of a pressed button) can lock the window on the screen to stay in the location where it is currently being displayed in (instead of continuously tracking the moving finger). Yet in other embodiments, the input of a button can control which view of information is being displayed within the window. For example, by pressing a button, the user may switch between the satellite view, traffic view and terrain view of a particular map.

Although most examples of a display screen are described herein with reference to a mobile phone or tablet computer, the display screen can include any interface capable of presenting information that can be viewed by the user. In some embodiments, the display screen may be a separate component from the computing device, such as a component that communicates wirelessly with the computing device. In alternative embodiments, the display screen may be augmented reality goggles, virtual reality glasses, an image projection device that projects an image or moving image (e.g., video) onto a surface, or any other device.

FIG. 1 illustrates an example of displaying alternate views of a map on a screen of a portable computing device, in accordance with various embodiments. In the illustrated embodiment, the portable computing device 102, such as a mobile phone is shown, wherein the display screen of the device is displaying a map 106 of a particular area. The map is being displayed using a road map view. When the user moves his hand over the display screen, the finger 100 can be detected to be within a particular distance 104 of the display screen. In one embodiment, the distance may need to be a minimum specified threshold distance (e.g., 6 inches above the screen) before the alternate view display is activated on a device. In other embodiments, the finger may be located within any maximum detectable sensor range from the device.

In accordance with an embodiment, when the user's finger (or a portion thereof) is detected by the portable computing device 102, the device computes the location of the user's finger (e.g., fingertip) with respect to the display screen. The location can be computed based at least in part on data received from one or more sensors, such as cameras, ultrasonic sensors, and/or capacitive sensors of the device. Some examples of techniques for computing the location of the user's finger will be described in more detail with reference to FIGS. 6A-6D.

In accordance with an embodiment, when the finger is detected, the portable computing device 102 renders a window 108 that displays a portion of an alternate view of the map 106 on the display screen at a position that is proximate to the location of the user's finger. For example, the device may display the window 108 directly underneath the fingertip of the user's finger. Alternatively, the window may be displayed at a position that is slightly offset from the fingertip in order to prevent the finger from blocking the window.

In the illustrated embodiment, the window 108 is displaying a portion of the map showing a "street view" of that portion of the map 106 that is located under the fingertip. However, in alternative embodiments, the view displayed within the window may be a satellite view, a terrain view, a traffic view or any other view of the map data. In some embodiments, the view can be made configurable by the user. For example, the user may select an option to display a satellite view within the window and subsequently, when the user passes their finger over the screen, the window rendered underneath the finger would display a portion of the satellite view of the map located under the finger.

In various embodiments, as the user moves their finger laterally above the screen, the device can continue tracking the location of the finger and move the position of the window 108 corresponding to the lateral movement of the user's finger. The window 108 therefore "follows" the location of the user's finger and continuously changes to display the portion of the street view of the map over which the user's finger is located. This enables the user to preview the street view of the various portions of the map by moving their finger laterally above the screen. In some embodiments, the user is able to "lock" the window in a particular location by pressing a button, the touch screen or activating some other input means. As used in this example, the term lateral movement refers to the movement of the user's finger laterally with respect to the primary plane of the display screen such that the coordinates of the user's finger in the plane of the display screen (e.g., XY coordinates in the plane of the display screen) change as a result of the lateral movement. Lateral movement can be contrasted with movement of the user's finger closer and further away from the display screen (e.g., movement perpendicular to the plane of the display screen), thereby changing the distance between the finger and the screen, without necessarily causing changes in the coordinates of the finger in the plane of the display screen.

In various embodiments, the user is also able to move their finger closer and away from the display screen (e.g., perpendicular to the plane of the display screen), thereby changing the distance between the finger and the screen. The change in distance can be detected by the computing device based on data received from one or more sensors of the computing device, as described with reference to FIGS. 6A-6D. In one embodiment, the device can control the size of the window 108 based at least in part on the distance between the user's finger and the display screen. For example, when the user's finger gets closer to the display screen, the size of the window 108 is increased to cover a larger portion of the map 106 and when the user's finger moves away from the screen, the size of the window 108 is decreased to cover a smaller portion of the map 106. In other embodiments, the device may switch the view being displayed within the window 108 based at least in part on the distance between the user's finger and the screen. For example, when the user's finger is within a first range (e.g., 0-3 inches away from the screen), the device may display a terrain view of the portion of the map within the window 108 and when the user's finger is within a second range (e.g., 3-6 inches away from the screen), the device may display a portion of the satellite view of the map.

In one embodiment, the window displaying the alternate view can be controlled by using one or more buttons of the portable computing device 102 as a "clutch" which can activate or deactivate the rendering of window 108. For example, a user can hold a button pressed down to activate the sensing of the finger above the screen. As long as the user holds the button, the device can continue tracking the finger and displaying a window 108 showing a portion of the street view of the map underneath the fingertip. When the user lets go of the button, the device may cease rendering the window 108 showing the street view. It should be noted that the use of the clutch is not required for all embodiments described herein and in many other embodiments, the device can automatically begin rendering the window in response to detecting the user's finger near the screen.

Figure 2:
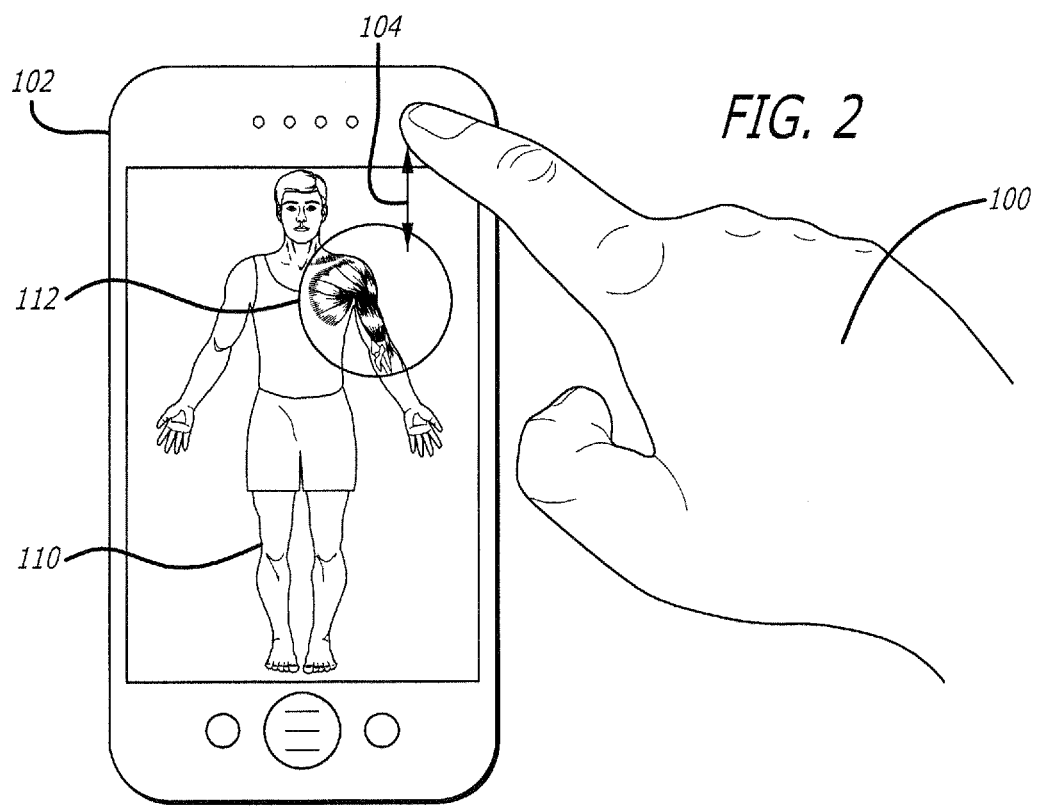
FIG. 2 illustrates an example of displaying alternate views of a diagram of a human body on a screen of a portable computing device, in accordance with various embodiments.

FIG. 2 illustrates an example of displaying alternate views of a diagram of a human body on a screen of a portable computing device, in accordance with various embodiments. In the illustrated embodiment, the portable computing device 102 is displaying an image of a human body 110 on the display screen. The image can be an actual digital photograph of a human body captured by a digital camera of the portable device, or it may be an illustration diagram that is displayed on the screen of the device.

When the user's finger 100 is detected within a distance 104 of the display screen, the device renders a window 112 that displays an alternate view of the image of the human body 110. In this particular embodiment, the alternate view is a portion of the muscle view of the human body located underneath the user's finger and displayed within the window 112. As previously described, when the user laterally moves their finger 100 over the various portions of the human body 110, the window 112 tracks the location of the user's finger and displays the muscle view of the body within a window located underneath the user's finger 100.

Figure 3:
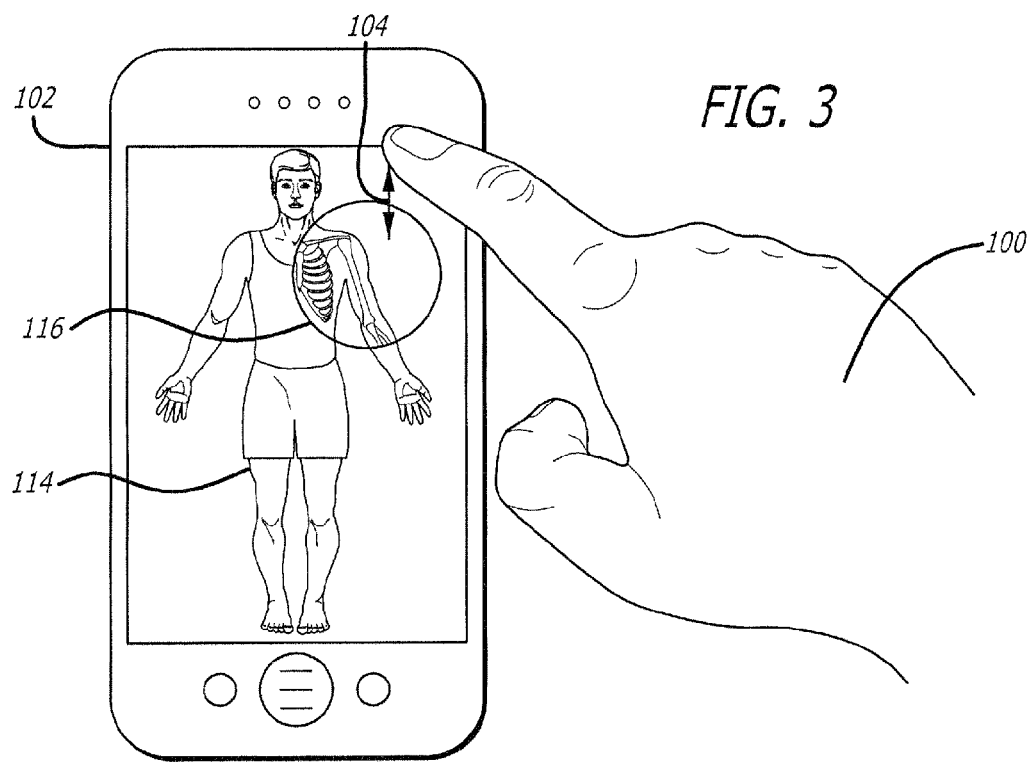
FIG. 3 illustrates an example of switching the view inside of the window based at least in part on the change in distance between the user's finger and the display screen, in accordance with various embodiments.

FIG. 3 illustrates an example of switching the view inside of the window based at least in part on the change in distance between the user's finger and the display screen, in accordance with various embodiments. In this figure, the display screen of the portable device 102 is displaying an image of the human body, as illustrated previously in FIG. 2. In this embodiment, however, the user has moved their finger 100 closer to the display screen. In this illustrated embodiment, the device detects that the distance 104 between the finger and the display screen has decreased to a specified threshold (e.g., is within a particular range) and changes the view inside the window 116 to begin displaying a skeleton view showing the bone structure of the human body 114. In some embodiments, if the user once again moves their finger away from the screen, the device may switch back to the muscle view, as illustrated in FIG. 2. In this manner, the user can switch between the multiple views by moving their finger closer and farther away from the screen over various portions of the image. As previously mentioned, in some embodiments, there can be ranges or distances corresponding to each of the multiple views. For example, when the user's finger is within the range from 3 to 6 inches away from the screen, the device may display the muscle view, and when the finger is within the range from 0 to 3 inches away from the screen, the device may display the skeleton view.

Figure 4:
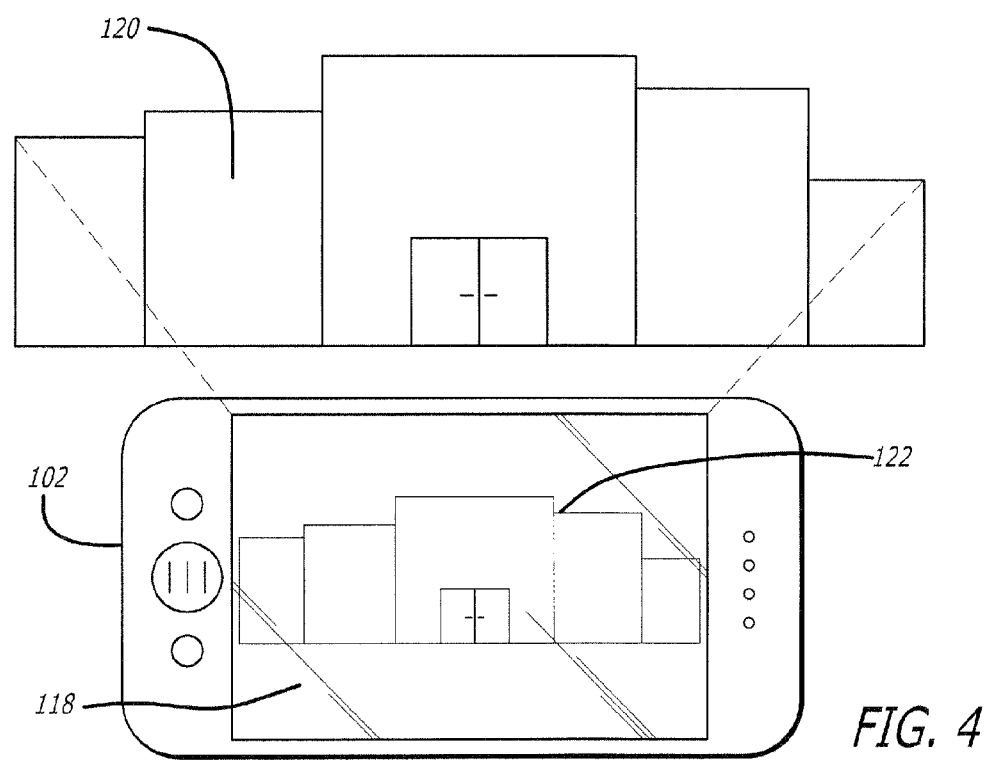
FIG. 4 illustrates an example of a portable device used to capture an image of a building by using one or more cameras, in accordance with various embodiments.

FIG. 4 illustrates an example of a portable device used to capture an image of a building by using one or more cameras, in accordance with various embodiments. In the illustrated embodiment, the user may aim the portable computing device 102 (e.g., mobile phone) to enable the one or more cameras of the device to capture an image of the building 120, such as a shopping center, store, or other structure. As illustrated, the image of the building 120 is displayed on the display screen of the device. In some embodiments the user may activate the shutter of the camera to capture (e.g., "snap") a digital image of the structure 120.

Figure 5:
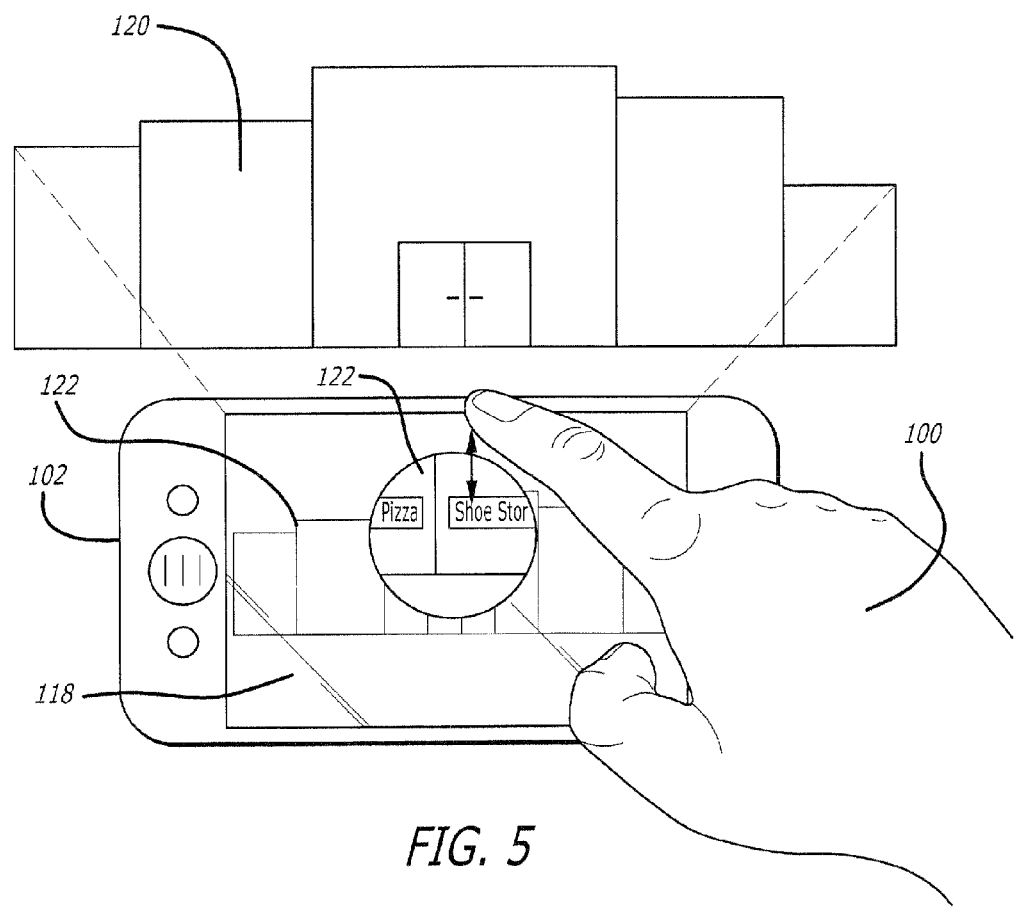
FIG. 5 illustrates an example of displaying an alternate view of the building in an image captured by a portable device, in accordance with various embodiments.

FIG. 5 illustrates an example of displaying an alternate view of the building in an image captured by a portable device, in accordance with various embodiments. In this figure, the portable computing device 102 is aimed at the building 120, similarly to FIG. 4. The display screen of the device is showing the outside view 118 of the building 120. When the user moves their finger 100 within a distance of the display screen, the computing device detects the user's finger 100, computes the location of the finger, and renders a window 122 on the display screen, showing a portion of an inside view of the building underneath the finger. In this particular example, the inside view of the building shows that a restaurant ("Pizza") and a store ("Shoe Store") is located inside the portion of the building over which the user's finger is located.

In one embodiment, the user may need to capture an image of the building 120 (e.g., by activating the shutter of the camera) and store the image in memory of the device before activating the display of the window 122 showing the inside view of the building 120. In other embodiments, the device may automatically activate the window 122 in response to detecting the user's finger over the display screen, without having to capture (i.e. "snap") the image and store it in memory of the device.

In some embodiments, the computing device 102 may use geographical location data to determine the location of the building 120 and to obtain the information about the inside of the building 120. For example, when the user points the device at building 120, the device 102 can use data received by a global positioning system (GPS) receiver or other location determining mechanism to determine the address of building 120. The device may then search for information about the building on a network (e.g., Internet) using the address and obtain any images of the inside of the building that can be used to render the window 122. For example, the portable computing device may determine that the building 120 is a shopping center that has a pizza restaurant and a shoe store in the portion of the building over which the user's finger is currently located. This information can then be used to render the window 122 as the user is moving their finger near the display screen.

It should be noted that although FIGS. 1-5 illustrate examples of utilizing map data, a human body and a building, not all of the embodiments described herein are limited to these examples. In alternative embodiments, the information displayed on the screen may include any other information that may be displayed using multiple views, including but not limited to diagrams of mechanical devices and circuit boards, diagrams of earth layers, computer aided design (CAD) drawings, astronomy images, biological plants and organisms, and the like.

Furthermore, while FIGS. 1-5 illustrate examples of utilizing the display screen of a mobile phone, it is noted that in various other embodiments, any other display screen can be utilized. As previously mentioned, the display screen may be the touch screen of a tablet computer, a touch screen of an electronic reader (e-reader), augmented reality goggles, virtual reality glasses, an image projection device that projects an image or moving image (e.g., video) onto a surface, or any other device. For example, if the display screen is a pair of augmented reality goggles, the user's finger (or other object) may be tracked by using one or more sensors (camera, capacitive sensors, etc.) embedded in the goggles. Similarly, if the display screen is an image projection device, the sensors may be embedded in the projection device, on the surface on which the image is projected or in any other device.

In various embodiments, to determine the location of an object, such as the user's finger, with respect to a display screen or other such element of a computing device, a number of potential approaches can be used. FIGS. 6A, 6B, 6C and 6D illustrate an example approach to determining a relative distance and/or location of an object (e.g., a user's finger or other feature) that can be utilized in accordance with various embodiments. In this example, input can be provided to a computing device 602 by monitoring the position of the user's fingertip 604 with respect to the device, although various other features of the user can be used as well, as discussed and suggested elsewhere herein. In some embodiments, a single camera can be used to capture image information including the user's fingertip, where the relative location can be determined in two dimensions from the position of the fingertip in the image and the distance determined by the relative size of the fingertip in the image. In other embodiments, a distance detector or other such sensor can be used to provide the distance information. The illustrated computing device 602 in this example instead includes at least two different image capture elements 606, 608 positioned on the device with a sufficient separation such that the device can utilize stereoscopic imaging (or another such approach) to determine a relative position of one or more features with respect to the device in three dimensions. Although two cameras are illustrated near a top and bottom of the device in this example, it should be understood that there can be additional or alternative imaging elements of the same or a different type at various other locations on the device within the scope of the various embodiments. Further, it should be understood that terms such as "top" and "upper" are used for clarity of explanation and are not intended to require specific orientations unless otherwise stated. In this example, the upper camera 606 is able to see the fingertip 604 of the user as long as that feature is within a field of view 610 of the upper camera 606 and there are no obstructions between the upper camera and that feature. If software executing on the computing device (or otherwise in communication with the computing device) is able to determine information such as the angular field of view of the camera, the zoom level at which the information is currently being captured, and any other such relevant information, the software can determine an approximate direction 614 of the fingertip with respect to the upper camera. In some embodiments, methods such as ultrasonic detection, feature size analysis, luminance analysis through active illumination, or other such distance measurement approaches can be used to assist with position determination as well.

Figure 6A:
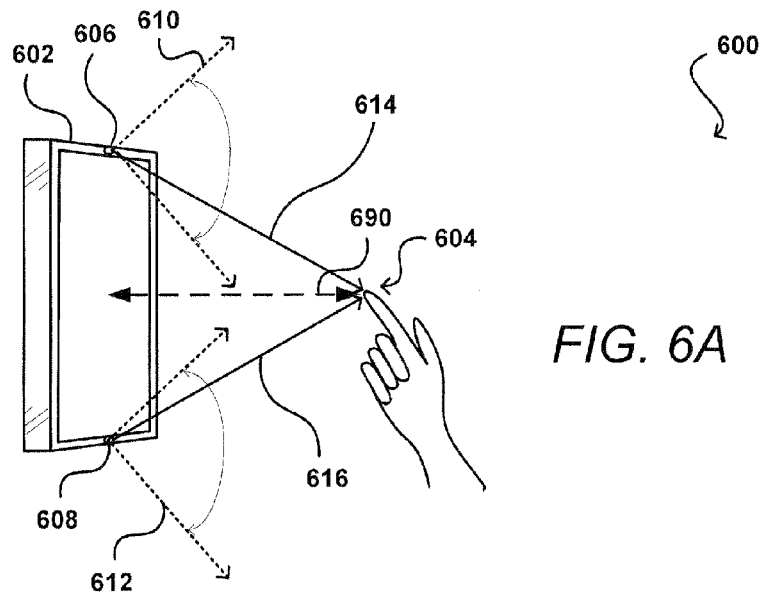
FIGS. 6A, 6B, 6C and 6D illustrate an example approach to determining a relative distance and/or location of at least one feature of a user that can be utilized in accordance with various embodiments.

In this example, a second camera is used to assist with location determination as well as to enable distance determinations through stereoscopic imaging. The lower camera 608 in FIG. 6A is also able to image the fingertip 604 as long as the feature is at least partially within the field of view 612 of the lower camera 608. Using a similar process to that described above, appropriate software can analyze the image information captured by the lower camera to determine an approximate direction 616 to the user's fingertip. The direction can be determined, in at least some embodiments, by looking at a distance from a center (or other) point of the image and comparing that to the angular measure of the field of view of the camera. For example, a feature in the middle of a captured image is likely directly in front of the respective capture element. If the feature is at the very edge of the image, then the feature is likely at a forty-five degree angle from a vector orthogonal to the image plane of the capture element. Positions between the edge and the center correspond to intermediate angles as would be apparent to one of ordinary skill in the art, and as known in the art for stereoscopic imaging. Once the direction vectors from at least two image capture elements are determined for a given feature, the intersection point of those vectors can be determined, which corresponds to the approximate relative position in three dimensions of the respective feature.

In some embodiments, information from a single camera can be used to determine the relative distance to an object, such as a feature of a user (e.g., fingertip). For example, a device can determine the size of a feature (e.g., a finger, hand, pen, or stylus) used to provide input to the device. By monitoring the relative size in the captured image information, the device can estimate the relative distance to the feature. This estimated distance can be used to assist with location determination using a single camera or sensor approach.

Figures 6B, 6C:
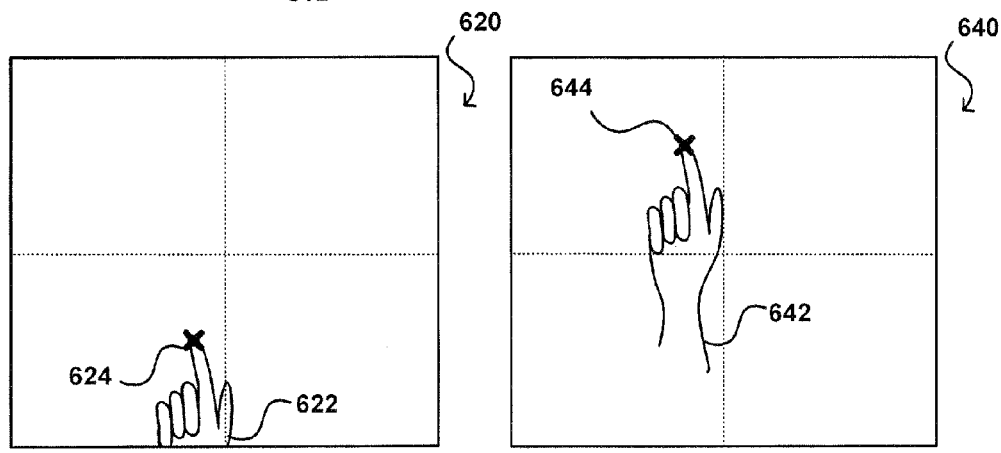

Further illustrating such an example approach, FIGS. 6B and 6C illustrate example images 620, 640 that could be captured of the fingertip using the cameras 606, 608 of FIG. 6A. In this example, FIG. 6B illustrates an example image 620 that could be captured using the upper camera 606 in FIG. 6A. One or more image analysis algorithms can be used to analyze the image to perform pattern recognition, shape recognition, or another such process to identify a feature of interest, such as the user's fingertip, thumb, hand, or other such feature. Approaches to identifying a feature in an image, such may include feature detection, facial feature extraction, feature recognition, stereo vision sensing, character recognition, attribute estimation, or radial basis function (RBF) analysis approaches, are well known in the art and will not be discussed herein in detail. Upon identifying the feature, here the user's hand 622, at least one point of interest 624, here the tip of the user's index finger, is determined. As discussed above, the software can use the location of this point with information about the camera to determine a relative direction to the fingertip. A similar approach can be used with the image 640 captured by the lower camera 608 as illustrated in FIG. 6C, where the hand 642 is located and a direction to the corresponding point 644 determined. As illustrated in FIGS. 6B and 6C, there can be offsets in the relative positions of the features due at least in part to the separation of the cameras. Further, there can be offsets due to the physical locations in three dimensions of the features of interest. By looking for the intersection of the direction vectors to determine the position of the fingertip in three dimensions, a corresponding input can be determined within a determined level of accuracy. If higher accuracy is needed, higher resolution and/or additional elements can be used in various embodiments. Further, any other stereoscopic or similar approach for determining relative positions in three dimensions can be used as well within the scope of the various embodiments.

As can be seen in FIG. 6A, however, there can be a region near the surface of the screen that falls outside the fields of view of the cameras on the device, which creates a "dead zone" where the location of a fingertip or other feature cannot be determined (at least accurately or quickly) using images captured by the cameras of the device.

Figure 6D:
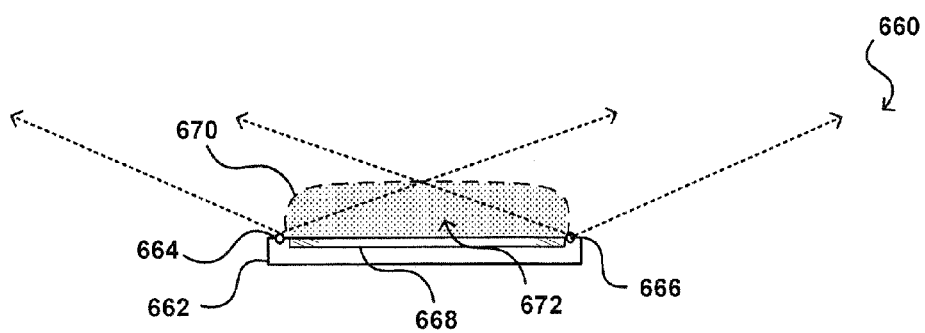

FIG. 6D illustrates an example configuration 660 wherein the device 662 includes a pair of front-facing cameras 664, 666 each capable of capturing images over a respective field of view. If a fingertip or other feature near a display screen 668 of the device falls within at least one of these fields of view, the device can analyze images or video captured by these cameras to determine the location of the fingertip. In order to account for position in the dead zone outside the fields of view near the display, the device can utilize a second detection approach, such as by using a capacitive touch detection component as known or used in the art with various touch screens. A capacitive touch detection component can detect position at or near the surface of the display screen. By adjusting the parameters of the capacitive touch detection component, the device can have a detection range 670 that covers the dead zone and also at least partially overlaps the fields of view. Such an approach enables the location of a fingertip or feature to be detected when that fingertip is within a given distance of the display screen, whether or not the fingertip can be seen by one of the cameras. Other location detection approaches can be used as well, such as ultrasonic detection, distance detection, optical analysis, and the like.

Figure 7:
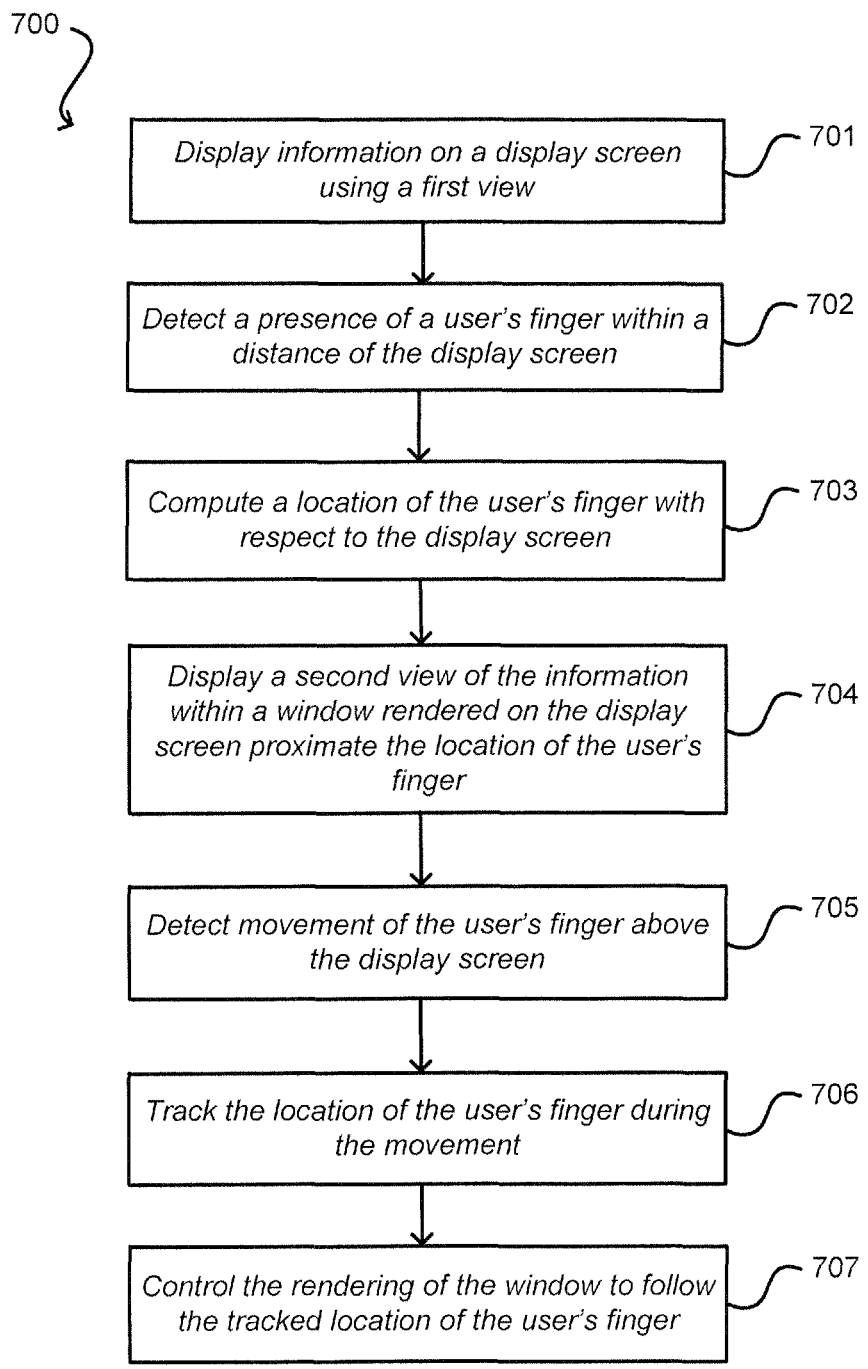
FIG. 7 illustrates an example of a process for displaying alternate views of information on a portable computing device, in accordance with various embodiments.

FIG. 7 illustrates an example of a process 700 for displaying an alternate view of information on a portable computing device, in accordance with various embodiments. Although this figure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments. In addition, the process illustrations contained herein are intended to demonstrate an idea of the process flow to one of ordinary skill in the art, rather than specifying the actual sequences of code execution, which may be implemented as different flows or sequences, optimized for performance, or otherwise modified in various ways.

In operation 701, a first view of information is displayed on a display screen. The information can include any type of information that is capable of being displayed in multiple views, including but not limited to map data, diagram of a human body or other organism, diagram of a building or other structure, and the like. In some embodiments, the first view may be the default view of the information, such as a road map view of the map data for example.

In operation 702, a presence of an object is detected near the screen (e.g., within a threshold distance of the display screen). In various embodiments, the object can be a user's finger or other feature, a stylus, or other object. The object can be detected using data obtained from one or more sensors, such as cameras, capacitive sensors, ultrasonic sensors, or combination thereof.

In operation 703, the device computes the location of the object (or a portion of the object) with respect to the display screen. The location can be computed based at least in part on the data received from the one or more sensors. In some embodiments, the location can be computed using the techniques described above with reference to FIGS. 6A-6D.

In operation 704, a portion of a second view of the information is displayed within a window rendered on the display screen at a position proximate to the location of the object. For example, an oval or rectangular window can be rendered directly underneath the fingertip of the user's finger being detected above the screen. Alternatively, the window can be rendered at a slight offset from the center of the location of the finger in order to prevent the finger from blocking the view of the window.

In operation 705, the device detects movement of the object, such as when a user is moving the finger laterally above the display screen. The user may move the finger in three dimensions and the device can track the location of the user's finger during the movement, as shown in operation 706.

In operation 707, the device controls the rendering of the window on the display screen such that the window follows the location of the object being tracked. For example, when the user's finger is moving laterally with respect to the screen, the position of the window moves corresponding to the lateral movement of the finger. In this manner, the window displays the second view of the information on the portions of the screen over which the user's finger passes. As the window moves on the display screen, the content displayed within the window changes according to which portion of the map the user's finger is located. The user can explore the alternate views of the information over various portions of the display screen. In some embodiments, the user can mover their finger closer to the display screen to enlarge the window and away from the screen to decrease the size of the window. Alternatively, changes in the distance between the finger and the device can be used to select a particular view to display within the window, as previously described.

Figure 8:
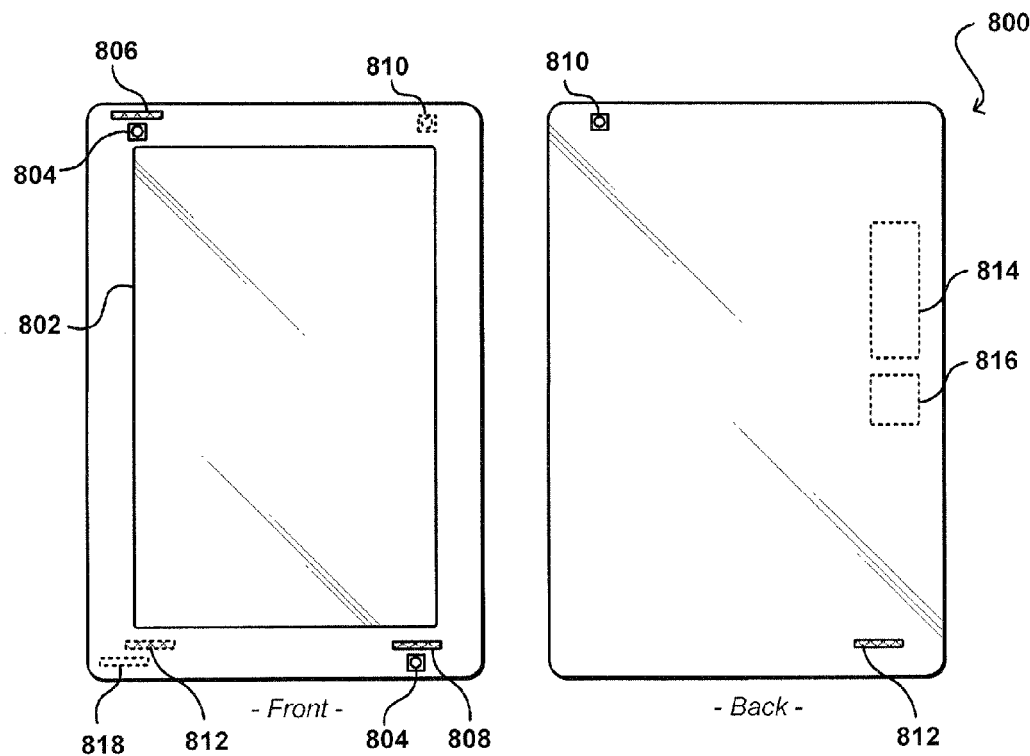
FIG. 8 illustrates front and back views of an example portable computing device that can be used in accordance with various embodiments.

FIG. 8 illustrates front and back views of an example portable computing device 800 that can be used in accordance with various embodiments. Although one type of portable computing device (e.g., a smart phone, an electronic book reader, or tablet computer) is shown, it should be understood that various other types of electronic devices that are capable of determining, processing, and providing input can be used in accordance with various embodiments discussed herein. The devices can include, for example, notebook computers, personal data assistants, cellular phones, video gaming consoles or controllers, and portable media players, among others.

In this example, the portable computing device 800 has a display screen 802 (e.g., a liquid crystal display (LCD) element) operable to display image content to one or more users or viewers of the device. In at least some embodiments, the display screen provides for touch or swipe-based input using, for example, capacitive or resistive touch technology. Such a display element can be used to, for example, enable a user to provide input by pressing on an area of the display corresponding to an image of a button, such as a right or left mouse button, touch point, etc. The device can also have touch and/or pressure sensitive material 810 on other areas of the device as well, such as on the sides or back of the device. While in at least some embodiments a user can provide input by touching or squeezing such a material, in other embodiments the material can be used to detect motion of the device through movement of a patterned surface with respect to the material.

The example portable computing device can include one or more image capture elements for purposes such as conventional image and/or video capture. As discussed elsewhere herein, the image capture elements can also be used for purposes such as to determine motion and receive gesture input. While the portable computing device in this example includes one image capture element 804 on the "front" of the device and one image capture element 810 on the "back" of the device, it should be understood that image capture elements could also, or alternatively, be placed on the sides or corners of the device, and that there can be any appropriate number of capture elements of similar or different types. Each image capture element may be, for example, a camera, a charge-coupled device (CCD), a motion detection sensor, or an infrared sensor, or can utilize another image capturing technology.

The portable computing device can also include at least one microphone 806 or other audio capture element capable of capturing audio data, such as may be used to determine changes in position or receive user input in certain embodiments. In some devices there may be only one microphone, while in other devices there might be at least one microphone on each side and/or corner of the device, or in other appropriate locations.

The device 800 in this example also includes at least one motion or position determining element operable to provide information such as a position, direction, motion, or orientation of the device. These elements can include, for example, accelerometers, inertial sensors, electronic gyroscopes, electronic compasses, and GPS elements. Various types of motion or changes in orientation can be used to provide input to the device that can trigger at least one control signal for another device. The example device also includes at least one communication mechanism 814, such as may include at least one wired or wireless component operable to communicate with one or more portable computing devices. The device also includes a power system 816, such as may include a battery operable to be recharged through conventional plug-in approaches, or through other approaches such as capacitive charging through proximity with a power mat or other such device. Various other elements and/or combinations are possible as well within the scope of various embodiments.

Figure 9:
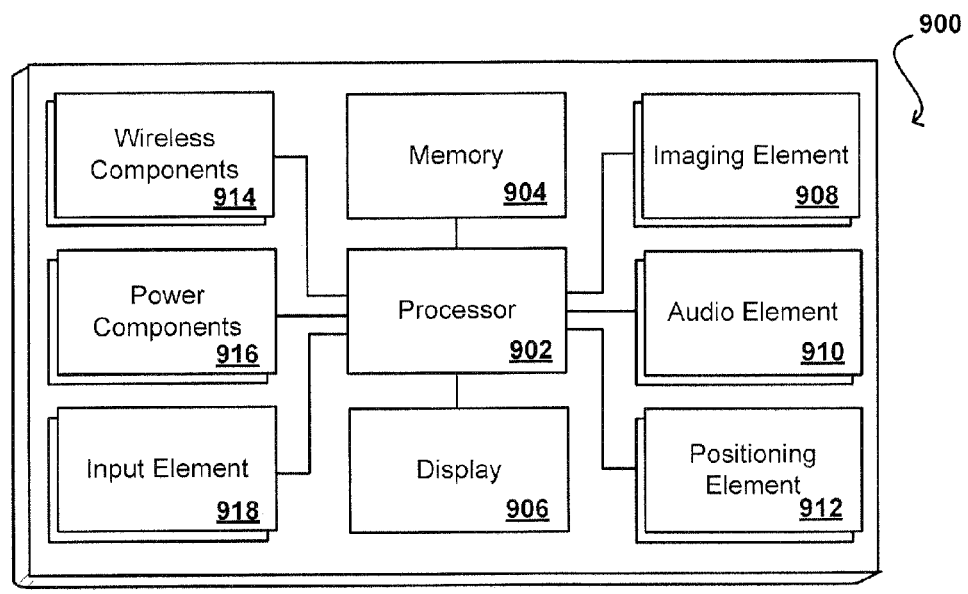
FIG. 9 illustrates an example set of basic components of a portable computing device, such as the device described with respect to FIG. 8.

In order to provide functionality such as that described with respect to FIG. 8, FIG. 9 illustrates an example set of basic components of a portable computing device 900, such as the device 800 described with respect to FIG. 8. In this example, the device includes at least one processor 902 for executing instructions that can be stored in at least one memory device or element 904. As would be apparent to one of ordinary skill in the art, the device can include many types of memory, data storage or computer-readable storage media, such as a first data storage for program instructions for execution by the processor 902, the same or separate storage can be used for images or data, a removable storage memory can be available for sharing information with other devices, etc.

The device typically will include some type of display element 906, such as a touch screen, electronic ink (e-ink), organic light emitting diode (OLED) or liquid crystal display (LCD), although devices such as portable media players might convey information via other means, such as through audio speakers. As discussed, the device in many embodiments will include at least one image capture element 908, such as one or more cameras that are able to image a user, people, or objects in the vicinity of the device. In at least some embodiments, the device can use the image information to determine gestures or motions of the user, which will enable the user to provide input through the portable device without having to actually contact and/or move the portable device. An image capture element also can be used to determine the surroundings of the device, as discussed herein. An image capture element can include any appropriate technology, such as a CCD image capture element having a sufficient resolution, focal range and viewable area, to capture an image of the user when the user is operating the device.

The device, in many embodiments, will include at least one audio element 910, such as one or more audio speakers and/or microphones. The microphones may be used to facilitate voice-enabled functions, such as voice recognition, digital recording, etc. The audio speakers may perform audio output. In some embodiments, the audio speaker(s) may reside separately from the device. The device, as described above relating to many embodiments, may also include at least one positioning element 912 that provides information such as a position, direction, motion, or orientation of the device. This positioning element 912 can include, for example, accelerometers, inertial sensors, electronic gyroscopes, electronic compasses, and GPS elements.

The device can include at least one additional input device 918 that is able to receive conventional input from a user. This conventional input can include, for example, a push button, touch pad, touch screen, wheel, joystick, keyboard, mouse, trackball, keypad or any other such device or element whereby a user can input a command to the device. These I/O devices could even be connected by a wireless infrared or Bluetooth or other link as well in some embodiments. In some embodiments, however, such a device might not include any buttons at all and might be controlled only through a combination of visual and audio commands such that a user can control the device without having to be in contact with the device.

The example device also includes one or more wireless components 914 operable to communicate with one or more portable computing devices within a communication range of the particular wireless channel. The wireless channel can be any appropriate channel used to enable devices to communicate wirelessly, such as Bluetooth, cellular, or Wi-Fi channels. It should be understood that the device can have one or more conventional wired communications connections as known in the art. The example device includes various power components 916 known in the art for providing power to a portable computing device, which can include capacitive charging elements for use with a power pad or similar device as discussed elsewhere herein. The example device also can include at least one touch and/or pressure sensitive element 918, such as a touch sensitive material around a casing of the device, at least one region capable of providing squeeze-based input to the device, etc. In some embodiments this material can be used to determine motion, such as of the device or a user's finger, for example, while in other embodiments the material will be used to provide specific inputs or commands.

In some embodiments, a device can include the ability to activate and/or deactivate detection and/or command modes, such as when receiving a command from a user or an application, or retrying to determine an audio input or video input, etc. In some embodiments, a device can include an infrared detector or motion sensor, for example, which can be used to activate one or more detection modes. For example, a device might not attempt to detect or communicate with devices when there is not a user in the room. If an infrared detector (i.e., a detector with one-pixel resolution that detects changes in state) detects a user entering the room, for example, the device can activate a detection or control mode such that the device can be ready when needed by the user, but conserve power and resources when a user is not nearby.

A computing device, in accordance with various embodiments, may include a light-detecting element that is able to determine whether the device is exposed to ambient light or is in relative or complete darkness. Such an element can be beneficial in a number of ways. In certain conventional devices, a light-detecting element is used to determine when a user is holding a cell phone up to the user's face (causing the light-detecting element to be substantially shielded from the ambient light), which can trigger an action such as the display element of the phone to temporarily shut off (since the user cannot see the display element while holding the device to the user's ear). The light-detecting element could be used in conjunction with information from other elements to adjust the functionality of the device. For example, if the device is unable to detect a user's view location and a user is not holding the device but the device is exposed to ambient light, the device might determine that it has likely been set down by the user and might turn off the display element and disable certain functionality. If the device is unable to detect a user's view location, a user is not holding the device and the device is further not exposed to ambient light, the device might determine that the device has been placed in a bag or other compartment that is likely inaccessible to the user and thus might turn off or disable additional features that might otherwise have been available. In some embodiments, a user must either be looking at the device, holding the device or have the device out in the light in order to activate certain functionality of the device. In other embodiments, the device may include a display element that can operate in different modes, such as reflective (for bright situations) and emissive (for dark situations). Based on the detected light, the device may change modes.

Using the microphone, the device can disable other features for reasons substantially unrelated to power savings. For example, the device can use voice recognition to determine people near the device, such as children, and can disable or enable features, such as Internet access or parental controls, based thereon. Further, the device can analyze recorded noise to attempt to determine an environment, such as whether the device is in a car or on a plane, and that determination can help to decide which features to enable/disable or which actions are taken based upon other inputs. If voice recognition is used, words can be used as input, either directly spoken to the device or indirectly as picked up through conversation. For example, if the device determines that it is in a car, facing the user and detects a word such as "hungry" or "eat," then the device might turn on the display element and display information for nearby restaurants, etc. A user can have the option of turning off voice recording and conversation monitoring for privacy and other such purposes.

In some of the above examples, the actions taken by the device relate to deactivating certain functionality for purposes of reducing power consumption. It should be understood, however, that actions can correspond to other functions that can adjust similar and other potential issues with use of the device. For example, certain functions, such as requesting Web page content, searching for content on a hard drive and opening various applications, can take a certain amount of time to complete. For devices with limited resources, or that have heavy usage, a number of such operations occurring at the same time can cause the device to slow down or even lock up, which can lead to inefficiencies, degrade the user experience and potentially use more power.

In order to address at least some of these and other such issues, approaches in accordance with various embodiments can also utilize information such as user gaze direction to activate resources that are likely to be used in order to spread out the need for processing capacity, memory space and other such resources.

In some embodiments, the device can have sufficient processing capability, and the imaging element and associated analytical algorithm(s) may be sensitive enough to distinguish between the motion of the device, motion of a user's head, motion of the user's eyes and other such motions, based on the captured images alone. In other embodiments, such as where it may be desirable for the process to utilize a fairly simple imaging element and analysis approach, it can be desirable to include at least one orientation determining element that is able to determine a current orientation of the device. In one example, the at least one orientation determining element is at least one single- or multi-axis accelerometer that is able to detect factors such as three-dimensional position of the device and the magnitude and direction of movement of the device, as well as vibration, shock, etc. Methods for using elements such as accelerometers to determine orientation or movement of a device are also known in the art and will not be discussed herein in detail. Other elements for detecting orientation and/or movement can be used as well within the scope of various embodiments for use as the orientation determining element. When the input from an accelerometer or similar element is used along with the input from the camera, the relative movement can be more accurately interpreted, allowing for a more precise input and/or a less complex image analysis algorithm.

When using an imaging element of the computing device to detect motion of the device and/or user, for example, the computing device can use the background in the images to determine movement. For example, if a user holds the device at a fixed orientation (e.g. distance, angle, etc.) to the user and the user changes orientation to the surrounding environment, analyzing an image of the user alone will not result in detecting a change in an orientation of the device. Rather, in some embodiments, the computing device can still detect movement of the device by recognizing the changes in the background imagery behind the user. So, for example, if an object (e.g. a window, picture, tree, bush, building, car, etc.) moves to the left or right in the image, the device can determine that the device has changed orientation, even though the orientation of the device with respect to the user has not changed. In other embodiments, the device may detect that the user has moved with respect to the device and adjust accordingly. For example, if the user tilts their head to the left or right with respect to the device, the content rendered on the display element may likewise tilt to keep the content in orientation with the user.

Figure 10:
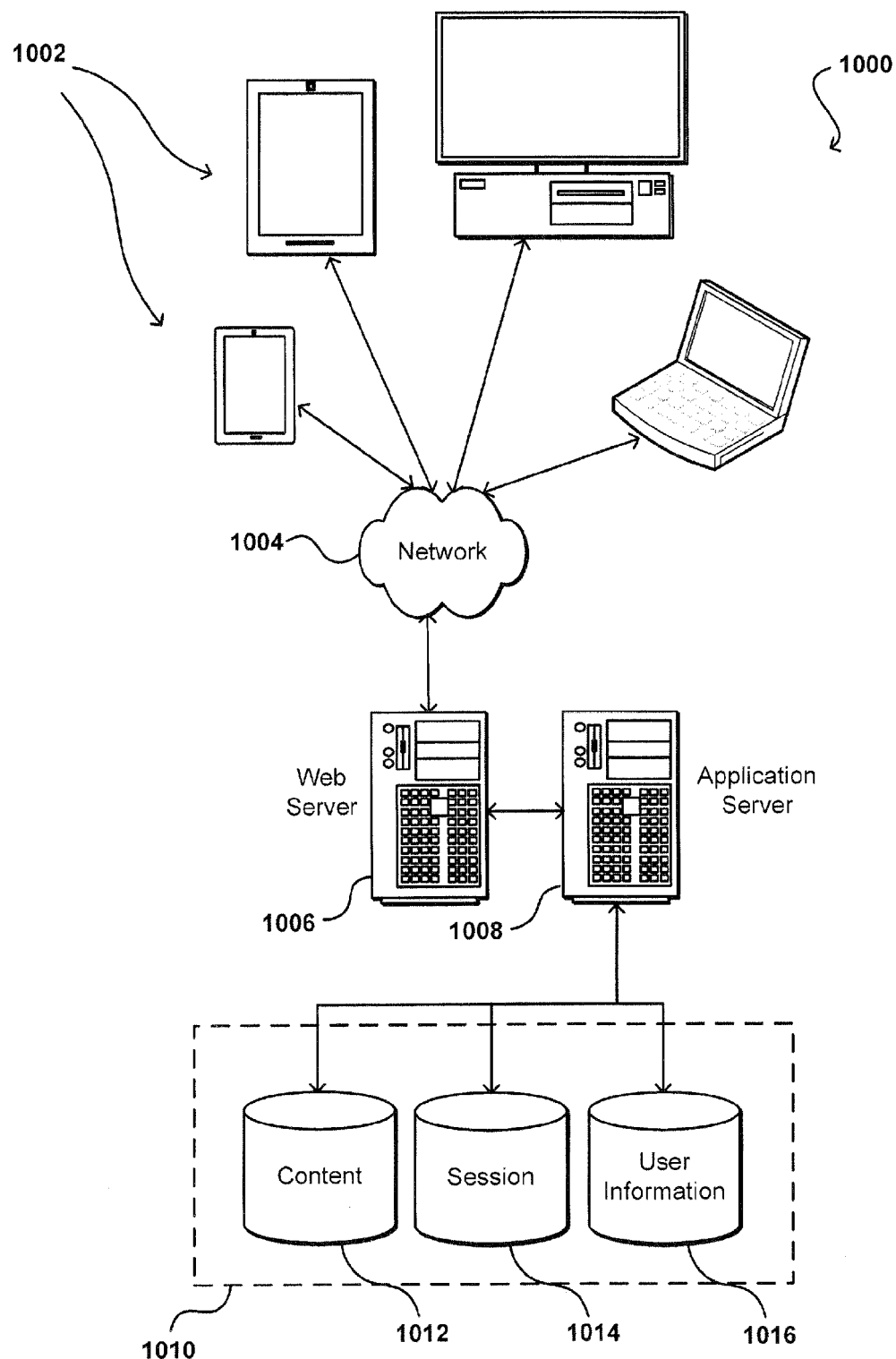
FIG. 10 illustrates an example of an environment for implementing aspects in accordance with various embodiments.

As discussed, different approaches can be implemented in various environments in accordance with the described embodiments. For example, FIG. 10 illustrates an example of an environment 1000 for implementing aspects in accordance with various embodiments. As will be appreciated, although a Web-based environment is used for purposes of explanation, different environments may be used, as appropriate, to implement various embodiments. The system includes an electronic client device 1002, which can include any appropriate device operable to send and receive requests, messages or information over an appropriate network 1004 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. The network could be a "push" network, a "pull" network, or a combination thereof. In a "push" network, one or more of the servers push out data to the client device. In a "pull" network, one or more of the servers send data to the client device upon request for the data by the client device. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 1006 for receiving requests and serving content in response thereto, although for other networks, an alternative device serving a similar purpose could be used, as would be apparent to one of ordinary skill in the art.

The illustrative environment includes at least one application server 1008 and a data store 1010. It should be understood that there can be several application servers, layers or other elements, processes or components, which may be chained or otherwise configured, which can interact to perform tasks such as obtaining data from an appropriate data store. As used herein, the term "data store" refers to any device or combination of devices capable of storing, accessing and retrieving data, which may include any combination and number of data servers, databases, data storage devices and data storage media, in any standard, distributed or clustered environment. The application server 1008 can include any appropriate hardware and software for integrating with the data store 1010 as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server 1006 in the form of HTML, XML or another appropriate structured language in this example. The handling of all requests and responses, as well as the delivery of content between the client device 1002 and the application server 1008, can be handled by the Web server 1006. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing content (e.g., production data) 1012 and user information 1016, which can be used to serve content for the production side. The data store is also shown to include a mechanism for storing log or session data 1014. It should be understood that there can be many other aspects that may need to be stored in the data store, such as page image information and access rights information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the client device 1002. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments can be further implemented in a wide variety of operating environments, which in some cases can include one or more user computers or computing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system can also include a number of workstations running any of a variety of commercially-available operating systems and other known applications for purposes such as development and database management. These devices can also include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS and AppleTalk. The network can be, for example, a local area network, a wide-area network, a virtual private network, the Internet, an intranet, an extranet, a public switched telephone network, an infrared network, a wireless network and any combination thereof.

In embodiments utilizing a Web server, the Web server can run any of a variety of server or mid-tier applications, including HTTP servers, FTP servers, CGI servers, data servers, Java servers and business application servers. The server(s) may also be capable of executing programs or scripts in response requests from user devices, such as by executing one or more Web applications that may be implemented as one or more scripts or programs written in any programming language, such as Java®, C, C# or C++ or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network (SAN) familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch-sensitive display element or keypad) and at least one output device (e.g., a display device, printer or speaker). Such a system may also include one or more storage devices, such as disk drives, optical storage devices and solid-state storage devices such as random access memory (RAM) or read-only memory (ROM), as well as removable media devices, memory cards, flash cards, etc.

Such devices can also include a computer-readable storage media reader, a communications device (e.g., a modem, a network card (wireless or wired), an infrared communication device) and working memory as described above. The computer-readable storage media reader can be connected with, or configured to receive, a computer-readable storage medium representing remote, local, fixed and/or removable storage devices as well as storage media for temporarily and/or more permanently containing, storing, transmitting and retrieving computer-readable information. The system and various devices also typically will include a number of software applications, modules, services or other elements located within at least one working memory device, including an operating system and application programs such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computing device, comprising:
    a display screen;
    at least one processor; and
    memory including instructions that, when executed by the at least one processor, cause the computing device to:
        display a first view of information on the display screen, wherein a portion of the first view of information is displayed using a set of pixels;
        detect at least a portion of a user's finger;
        compute a location of the at least the portion of the user's finger with respect to the display screen;
        display an alternate view of the portion of the first view of information within a window presented on the display screen at a position proximate to the location of the at least the portion of the user's finger, wherein the alternate view is displayed using the set of pixels, and wherein the alternate view includes at least a portion of additional information not included in the first view of information;
        detect a lateral movement of the user's finger with respect to the display screen; and
        move the position of the window corresponding to the lateral movement of the user's finger, wherein the alternate view displayed within the window is modified corresponding to the lateral movement.

2. The computing device of claim 1, wherein the first view is a road map view of map data, and wherein the alternate view is at least one of: a satellite view, a terrain view, or a traffic view of the map data.

3. The computing device of claim 1, the memory further comprising instructions that, when executed by the at least one processor, cause the computing device to:
    detect a change in distance between the user's finger and the display screen; and
    display a third view of information within the window.

4. A computer implemented method, comprising:
    under control of one or more computer systems configured with executable instructions, displaying a first view of information on a display screen, wherein a portion of the first view of information is displayed using a set of pixels;

detecting a feature within a specified distance of the display screen;

computing a location of the feature with respect to the display screen; and displaying, on a region of the display screen proximate to the location of the feature, an alternate view of the portion of the first view of information corresponding to the region, wherein the alternate view is displayed using the set of pixels, and wherein the alternate view includes at least a portion of additional information not included in the first view of information.

5. The computer implemented method of claim 4, further comprising:

detecting movement of the feature and tracking the location of the feature during the movement; and displaying on a second region of the display screen, the alternate view corresponding to the second region, the second region being proximate to the location of the feature.

6. The computer implemented method of claim 4, wherein the region displaying the alternate view is a window that is one of: oval or rectangular in shape.

7. The computer implemented method of claim 4, further comprising:

detecting a change in distance between the feature and the display screen; and modifying a size of the region in response to the change in the distance.

8. The computer implemented method of claim 4, further comprising:

detecting a change in distance between the feature and the display screen; and displaying, on the region of the display screen proximate to the location of the feature, a third view of information.

9. The computer implemented method of claim 8, wherein the alternate view corresponds to a first range between the feature and the display screen, and wherein the third view corresponds to a second range between the feature and the display screen.

10. The computer implemented method of claim 4, wherein displaying the alternate view is performed in response to detecting input of at least one button on a computing device.

11. The computer implemented method of claim 4, wherein the first view is a road map view of map data, and wherein the alternative view is at least one of: a satellite view, a terrain view, or a traffic view of the map data.

12. The computer implemented method of claim 4, wherein the first view is a skin layer view of data corresponding to a representation of an organism, and wherein the alternate view is at least one of: a muscular layer view representing a muscular structure of the organism, or a skeleton view representing a bone structure of a skeleton of the organism.

13. The computer implemented method of claim 4, wherein the information is an image captured by at least one camera of a computing device.

14. The computer implemented method of claim 4, wherein the feature is at least a portion of a human finger within the specified distance of the display screen.

15. The computer implemented method of claim 4, wherein the location of the feature is computed based at least in part on data obtained by one or more sensors of a computing device, the one or more sensors including at least one of: a camera, a capacitive sensor, or an ultrasonic sensor.

16. A computing device, comprising:

a display screen;

at least one processor; and memory including instructions that, when executed by the processor, cause the computing device to:

display a first view of information on the display screen, wherein a portion of the first view of information is displayed using a set of pixels;

detect a feature within a specified distance of the display screen;

compute a location of the feature with respect to the display screen; and display, on a region of the display screen proximate to the location of the feature, an alternate view of the portion of the first view of information corresponding to the region, wherein the alternate view is displayed using the set of pixels, and wherein the alternate view includes at least a portion of additional information not included in the first view of information.

17. The computing device of claim 16, wherein the memory further includes instructions to cause the computing device to:

detect movement of the feature and tracking the location of the feature during the movement; and display on a second region of the display screen, the alternate view corresponding to the second region, the second region corresponding to the location of the feature.

18. The computing device of claim 16, wherein the region displaying the portion of the alternate view is a window that is one of: oval or rectangular in shape.

19. The computing device of claim 16, wherein the memory further includes instructions to cause the computing device to:

detect that a distance between the feature and the display screen has changed; and modify a size of the region displaying the alternate view.

20. The computing device of claim 16, wherein the memory further includes instructions to cause the computing device to:

detect that a distance between the feature and the display screen has changed; and display, on the region of the display screen proximate to the location of the feature, a third view of information.

21. A non-transitory computer readable storage medium storing one or more sequences of instructions executable by one or more processors to perform a set of operations comprising:

displaying a first view of information on a display screen, wherein a portion of the first view of information is displayed using a set of pixels;

detecting a feature within a specified distance of the display screen;

computing a location of the feature with respect to the display screen; and displaying, on a region of the display screen proximate to the location of the feature, an alternate view of the portion of the first view of information corresponding to the region, wherein the alternate view is displayed using the set of pixels, and wherein the alternate view includes at least a portion of additional information not included in the first view of information.

22. The non-transitory computer readable storage medium of claim 21, further comprising instructions for:

detecting movement of the feature and tracking the location of the feature during the movement; and displaying on a second region of the display screen, the alternate view corresponding to the second region, the second region corresponding to the location of the feature.

23. The non-transitory computer readable storage medium of claim 21, wherein the region displaying the alternate view is a window that is one of: oval or rectangular in shape.

24. The non-transitory computer readable storage medium of claim 21, further comprising instructions for:
   detecting that a distance between the feature and the display screen has changed; and
   modifying a size of the region displaying the alternate view.

25. The non-transitory computer readable storage medium of claim 21, further comprising instructions for:
   detecting that a distance between the feature and the display screen has changed; and
   displaying, on the region of the display screen proximate to the location of the feature, a third view of information.

* * * * *